United States Patent

[11] 3,571,536

[72] Inventor Virgil H. Sparks
 Box 343, Chickasha, Okla. 73018
[21] Appl. No. 797,517
[22] Filed Feb. 7, 1969
[45] Patented Mar. 23, 1971

[54] IMPROVED PULL-RESPONSIVE BITE-SIGNALLING LIGHT FOR FLASHLIGHTS
 12 Claims, 6 Drawing Figs.
[52] U.S. Cl. ................................... 200/60, 43/17
[51] Int. Cl. ........................................ F21v 23/04
[50] Field of Search ............................ 200/60, 51, 79, 161, 16.1; 43/17; 74/574; 340/272

[56] References Cited
 UNITED STATES PATENTS

| | | | |
|---|---|---|---|
| 1,815,662 | 7/1931 | Bacon | 43/17 |
| 2,196,784 | 4/1940 | Simmons et al. | 43/17 |
| 2,619,559 | 11/1952 | Schenkel | 200/60 |
| 3,058,251 | 10/1962 | Brooks | 43/17 |
| 3,063,185 | 11/1962 | Dinger | 43/17 |
| 3,175,320 | 3/1965 | Dinger | 43/17 |
| 3,188,767 | 6/1965 | Finefield | 43/17 |

Primary Examiner—Robert K. Schaefer
Assistant Examiner—J. R. Scott
Attorneys—Clarence A. O'Brien and Harvey B. Jacobson ABSTRACT: A flashlight is equipped with circuit make and break means so constructed and cooperatively oriented with the coacting battery case that when a fish bites, the pull which is exerted acts on the movable contact, in a manner to (1) close the circuit (2) bring the signal light into play and (3) alert the fisherman. Several similar but structurally distinct circuit make and break adaptations are herein disclosed. Means is provided for mounting the flashlight on a rod, a pole, or where a trotline is used, on a vertical stake. The light bulb is provided with novel inner and outer caps, the outer cap being provided with distinguishably and selectively usable colored segments, that is, where a plurality of individual bite signals are grouped adjacent each other.

PATENTED MAR 23 1971 3,571,536

Virgil H. Sparks
INVENTOR.

BY Clarence A. O'Brien
and Harvey B. Jacobson
Attorneys

IMPROVED PULL-RESPONSIVE BITE-SIGNALLING LIGHT FOR FLASHLIGHTS

This invention relates to pull-responsive bite-signalling devices wherein a fishing light, a battery operated flashlight for example, is equipped with readily accessible circuit make and break means, which is so constructed hat the fisherman can attach the associatively cooperable end of the line thereto with a minimum of difficulty.

In carrying out the principles of this invention the battery case of substantially conventional-type flashlight is rigged with forward and rearward elastic straps, when the flashlight is to be used on a rod and reel (alternatively a simple pole) these straps re removable wrapped around the rod and detachably clipped in place. The line is attached to the movable contact and the signalling means is readied for use. When his means is used with a trotline one end of which is anchored on a bank or shore stake, the rearward strap is tied to the stake, the trotline is tied to the forward strap and a normally slack bypass line provides pull responsive connecting and operating means.

Briefly the fishing light or light source could, within the purview of the concept, be of an adaptable form other than that specifically shown. However, and as experience has shown, a flashlight of a substantially conventional type will well serve as the off and on source of light. Generically the battery case is constructed at it forward end to facilitate the association therewith of circuit make nd break means, more particularly, a relatively stationary contact and a companion and complemental relatively movable contact. The stationary contact is characterized by a readily applicable and removable adapter ring of conductive material, a peripheral portion of the ring being provided with a socket member having a screw-threaded socket. A rigid shank having a screw-threaded portion is screwed into the socket, said shank being preferably but not necessarily, provided at an outer end with an apertured yoke. The aperture in the yoke permits, when desired, the passage of an end of a fishing line therethrough for attachment to a component part of the movable contact. This last-named contact is actually and preferably made up of inner and outer coils appropriately connected and wherein the outer coil serves as a line guide, and the inner coil serves, when so desired, to accommodate a setscrew which is movable toward and from the shank and which functions as a limit stop. The movable contact means is operatively mounted on the battery case (which can be of metal or insulated material as desired) and is so arranged as to energize the battery and the associated signalling bulb. It is within the scope of the invention to utilize a simpler make and break adaptation wherein instead of the twin coils, a spring metal contact of L-shaped form is mounted on a metal case and is provided with a setscrew which can be pulled by a bite on the line in a manner to close the circuit and bring the signalling light into play.

In a more specific adaptation the forward end of the battery case is provided with a special collar which in turn is equipped with disc or diaphragm having a socket for the lamp bulb. In this case the aforementioned ring encircles and is mounted on a projecting end portion of the collar. The collar also serves to mount the inner domical cap of a dual cap cover. The inner cap has a sight opening which emits light rays which pass through the outer rotatably mounted cap. This outer cap is preferably provided with imperforate distinguishably colored segments or sectors which can be selectively lined up with the sight opening in the inner cap to facilitate use of the invention when a plurality of bite-signalling devices are erected in group relationship, whereby to minimize confusion where, for instance, several anglers are simultaneously fishing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
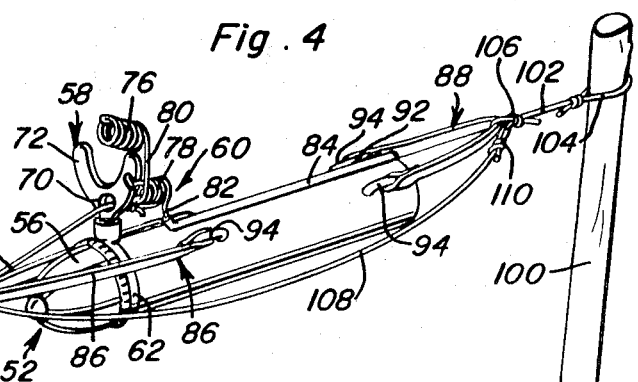
FIG. 5 is a fragmentary and elevation based on the embodiment of FIG. 1 and with portions broken away and showing how the inward coil serves as a holder for a setscrew capable of use as a limit stop as well as a circuit closing contact.
Figure 5:
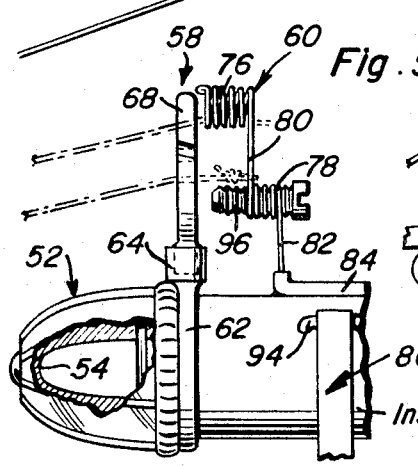
Figure 6:
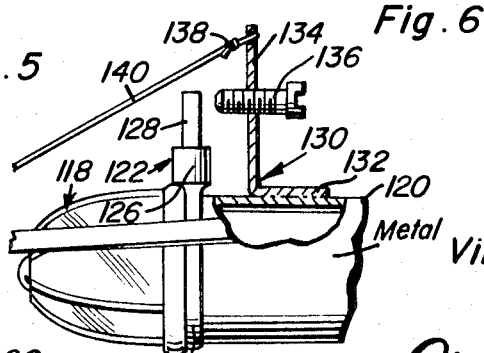

And FIG. 6 is a view similar in a manner of speaking to FIG. 5, that is fragmentarily shown and with parts appearing in section and which shows a modification in the circuit make and break means and employed, for example, when the battery case is of metal instead of insulated material.

Figure 1:
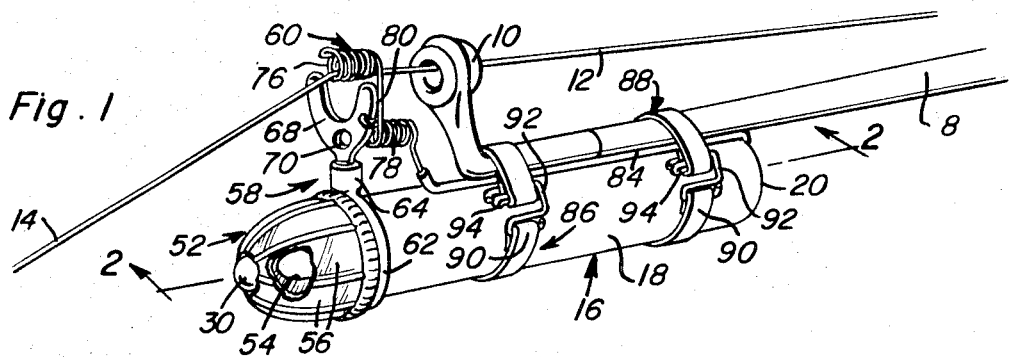
FIG. 1 is a view in perspective of a pull-responsive bite-signalling light constructed in accordance with the principles of the invention and showing the same removably strapped on the forward end of a rod and showing the circuit make and break means, that is one form or embodiment thereof and also showing a portion of the turnable outer cap broken away to uncover the opening in the inner cap.
Figure 2:
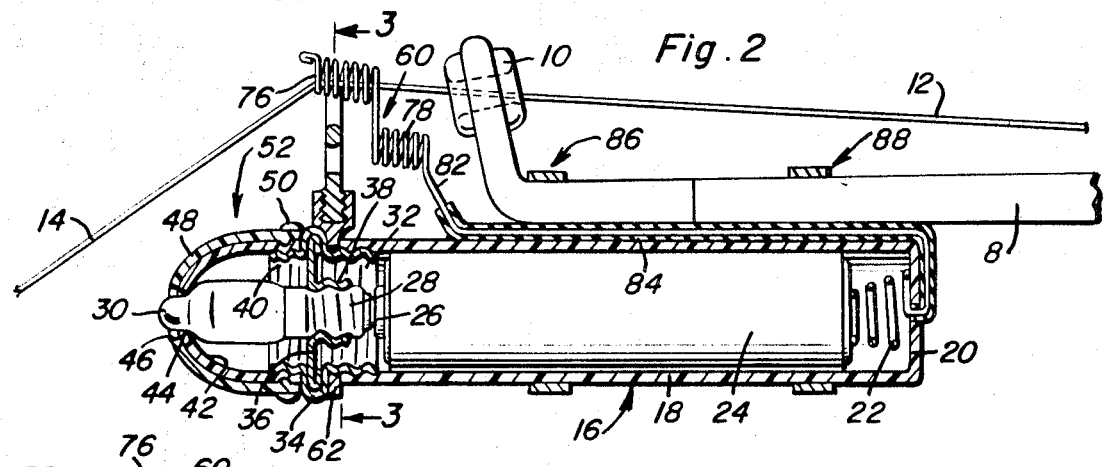
FIG. 2 is a view based on FIG. 1 and on a slightly enlarged scale and taken approximately on the plane of the section line 2–2 of FIG. 1 looking in the direction of the arrows.
Figure 3:
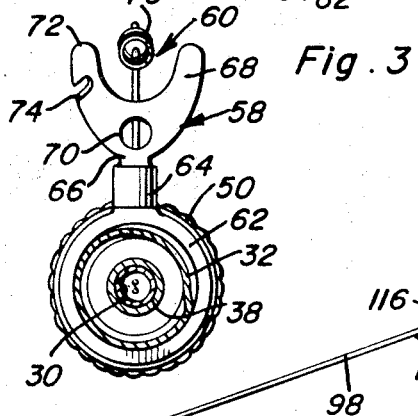
FIG. 3 is a section at right angles taken on the plane of the vertical section line 3–3 of FIG. 2.
Figure 4:
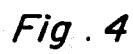
FIG. 4 is a view in perspective showing how the same attaching straps (FIG. 1) can be rearranged when the user is called upon to employ the bite-signalling light in connection with a trotline (not detailed) and an onshore vertical stake and wherein a bypass line is preferably used for best results.

By way of introduction to the description of the details it is to be pointed out that the component parts of the overall structure appearing primarily in FIGS. 1 to 3 inclusive correspond with like parts appearing in FIG. 4 and in FIG. 5. However and in FIGS. 4 and 5 the signalling light is employed in a slightly different manner. Inasmuch as the parts are basically the same in these views it is believed that it will simplify the presentation to refer to like parts with like reference numerals. On the other hand the modification and adaptation shown in FIG. 6 will be treated separately.

With the foregoing in mind and with reference in particular to FIGS. 1 and 2 the numeral 8 designates a fishing rod having a terminal guide eye 10 for that portion 12 of the fishing line 14 which passes therethrough. As already pointed out this aspect of the concept covers not only a "rod" but a simple cane or equivalent fishing "pole" as is believed to be evident.

The light source preferably comprises a conventional-type flashlight 16 and which comprises an elongate cylindrical battery case 18 of insulation material. The closed rearward end (FIG. 2) of the case is denoted at 20 and serves as an abutment for an enclosed coil spring 22 which yieldingly presses against an adjacent end of the dry cell battery 24. The forward contact of the battery 26 is in contact with the screw-type base 28 of the signalling light or bulb 30. The means for removably mounting the bulb is best shown in FIG. 2 wherein it will be observed that the numeral 32 designates a specially constructed screw-threaded collar of current conducting material, the inward end of which is screwed into the forward end of the battery case. The median portion is provided with an outstanding encircling channel or bead 34 which accommodatingly supports the edge of a diaphragm 36 centrally provided with a suitably threaded socket 38 for the base 28 of the bulb. The projecting end portion 40 is constructed to accommodate an attachable end of the inner domical cap 42. This cap is provided with an end opening 44 which is aligned with a complemental opening 46 in the outer domical cap 48. These two caps 42 and 48 fit telescopically together and the outer cap is provided with an internal rib which is keyed for rotation in a groove provided therefor in the inner cap as brought out in FIG. 2. The numeral 50 designates a grip which is suitably knurled to facilitate turning of the outer cap 48 with respect to the inner cap 42. The two caps provide a protective closure 52 for the bulb. It will be further noted that the inner cap is provided in one side with a slot or an opening 54 which emits light for passage through the circumferentially spaced sectors or segments 56. In practice these segments are of distinguishable colors and hence can be selectively registered with the slot or opening 54 to facilitate use of the invention where, for example, a number of fishermen are simultaneously fishing from a common fishing ground or area.

The circuit make and break means shown in FIGS. 1 to 5 inclusive comprises relatively stationary contact means denoted generally at 58 and complemental relatively movable contact means denoted generally at 60. The means 58 comprises an adapter ring 62 which snugly encases the collar 32 and which is provided on a peripheral side with a socket men member 64. This socket member is provided interiorly with screw threads to accommodate the screw threads shown on the shank 66 of the yoke. The yoke is denoted at 68 and is properly positioned for coaction with the movable contact means. It is provided with a line guide opening or aperture as at 70. Also the arm 72 (FIG. 174 is provided with a kerf or notch 74 which serves as a keeper. The movable contact means is fashioned from a length of wire the forward end of which is fashioned into a first outer coil 76 which serves to permit passage of the line therethrough in the manner illustrated in FIGS. 1 to 3 inclusive. The inner coil is denoted at 78 and the connecting wire is denoted at 80. This wire can be removably lodged in the keeper notch when one desires to keep the light on (not illustrated) for a given period of time, that is to use the flashlight for whatever purposes may at the time be served. The end portion 82 of the wire is passed along the exterior of the battery case through an insulation jacket 84 where it is carried to the rear end 22 and connected with the coil spring 22 in a manner to complete the circuit, that is when the circuit is closed. It is evident that when sufficient pull is exerted on the line 14 the coil 76 will engage in the crotch of the yoke and the circuit will be closed momentarily or as long as the required pull is exerted. When using this embodiment of the invention the forward and rearward elastic straps 86 and 88 come into play. One end 90 of each strap is provided with a hooklike clip 92 which is releasably cooperable with a cleat 94 fixed on the battery case. Using these cleats and hooks and the respective coacting end s ends of the straps both straps can be wrapped around the rod in a manner to temporarily attach the light source, that is the flashlight 16, to the fishing rod.

With respect to the slight variation shown in FIG. 5 it will be noted that this adaptation is such that the fishing line is connected to the part 80 of the movable contact means. Also a setscrew 96 is threaded into and through the inner coil 78. The setscrew can be used as a limit stop for adjusting the sensitivity of the movable contact means. Then, too, it will be evident that the screw-threaded shank on the yoke can be adjusted in the socket 64 for further adjustment needs. It is believed that the manner of use of this adaptation in FIG. 5 is substantially self-evident.

In the arrangement shown in FIG. 4 the numeral 98 designates a trotline. The onshore vertical stake is denoted at 100. The numeral 102 designates a short tying and anchoring line which is attached at 104 to the stake. This line is also connected at 106 to the rearward elastic flashlight suspension means or strap 88 when the latter is employed in the manner shown in FIG. 4, that is between the flashlight and the stake 100. The numeral 108 designates normally slack check line having its rearward end 110 attached to the short anchoring line 102. The other end portion is connected as at 112 to a coacting portion of the line 98. The terminal end portion 114 of this line is passed through the hole in the yoke as at 70 (FIG. 4) and is temporarily tied or connected to the inner coil 78 whereby the latter when under stress or strain is caused to close the circuit. It will be evident that in this arrangement the forward strap 86 is so arranged that the end portions straddle the forward portion of the flashlight and the two lines are connected to the bight portion as at 116. It follows that in this adaptation and arrangement the signalling light is operatively connected with the stake 100 and the auxiliary slack line permits, in conjunction with the elastic straps 86 and 88, accomplishment of the end result desired.

With reference now to FIG. 6 the cap means is denoted generally by the numeral 118. The battery case is denoted at 120 and is made of metal. In this arrangement the relatively stationary contact means is denoted at 122 and comprises an adapter ring 124 having a screw-threaded socket member 126 to accommodate the screw-threaded end portion (not detailed) of the attachable and detachable as well as adjustable circuit closing shank 128. The movable contact element or means here comprises a substantially L-shaped spring metal element 130. The short foot or limb 132 is mounted atop the metal case. The long limb is denoted at 134 and is provided with a setscrew 136 to which the end 138 of the fishing line 140 is operatively connected in the manner and for the purposes shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, a falling within the scope of the invention.

I claim:

1. A portable pull-actuated bite-signal for use by a fisherman comprising, in combination, a self-contained portable signalling device embodying a battery case having forward and rearward ends, an insertable and removable collar carried by said forward end, said collar having an axial socket for reception and retention of the base of a lamp bulb, a dry cell battery confined in said case, a lamp bulb having a base removably mounted in said socket and operatively cooperable with said battery, cover means mounted on said collar and encasing said lamp bulb, and circuit make and break means embodying relatively stationary contact means and complemental movable contact means mounted on said case and operatively oriented and associated with said dry cell battery and embodying a pull-responsive fishing-line guide, said guide being yieldingly resilient and normally disengaging said contact means but cooperatively engaging said contact means when a pull on the fishing line sufficient to actuate the line guide and momentarily or otherwise engage said contact means, said stationary contact means comprising a readily applicable and removable adapter ring, said ring conformingly surrounding said collar and abutting the forward end of said case, and a radially projecting contact element adjustably mounted on a peripheral surface of said ring.

2. The bite signal defined in and according to claim 1, and wherein said signalling device comprises a flashlight, said lamp bulb being applicable and removable, said cover means embodying an inner cap aligned with and removably mounted on said collar, said inner cap having an end opening to accommodate a coacting restricted tip end of the lamp bulb and a restricted windowlike sight opening for passage of light rays, and also embodying an outer cap exteriorly encompassing and rotatably mounted on said inner cap and having an end opening aligned with said first named end opening.

3. The bite signal defined in and according to claim 2, and wherein said caps are correspondingly domical in shape, the inner cap telescoping into the enclosing outer cap and having a plurality of distinguishably individually colored circumferentially arranged sectors, said sectors being selectively and individually registrable with said sight opening.

4. The bite signal defined in and according to claim 1 and wherein said peripheral surface is provided with a radial outstanding socket member whose socket is screw threaded, said contact element having a screw-threaded shank which is screwed into said socket.

5. The bite signal defined in and according to claim 1 and wherein said peripheral surface is provided with a radial outstanding socket member whose socket is screw-threaded, said contact element having a screw-threaded shank which is screwed into said socket, said contact element also embodying a forklike head and said head having a fishing line hole and also having a kerf in a marginal edge, said kerf providing a keeper notch.

6. The bite signal defined in and according to claim 1 and wherein said movable contact means comprises inward and outward spaced parallel coil springs, the outer coil spring providing the aforementioned line guide, the inner coil spring being adapted to accommodatingly hold and support a setscrew which functions as an adjustable limit stop, and a portion of said movable contact means being releasably seatable in said keeper notch when the user desires to close the circuit and keep the bulb lit or a predetermined period of time.

7. The bite signal defined in and according to claim 1 and wherein said case is elongated and is provided at its respective forward and rearward ends with elastic straps capable of being used singly and conjointly for mounting said case alongside and removably on a fishing rod and, alternatively, temporarily connecting the rearward end to an anchoring stake and the forward end to a coacting portion of said fishing line.

8. For use on and in conjunction with a flashlight of a type characterized by an elongated case closed at a rearward end and enclosing a spring-biased dry cell battery and open at its forward end and provided with a screw-threaded conductive collar having a centralized socket member equipped with a flashlight-type bulb and cap-type cover means for said bulb: circuit make and break means for switching the bulb off and on, said means comprising (1) stationary contact means and oriented and (2) coacting relatively movable contact means, said stationary contact means comprising an adapter ring designed and adapted to conformingly snugly encircle said collar in a manner to retain a given position, said ring having a screw-threaded socket member radiating and projecting outwardly from an outer peripheral surface of said ring, a contact element having a screw-threaded shank screwed into said socket member and a U-shaped yoke, said yoke having a hole for passage of a portion of a fishing line and one arm of the yoke having a keeper notch, said movable contact means comprising a length of current-conducting wire one end portion of which is adapted to be electrically connected to the dry cell battery, the other end being free and formed with a first coil providing a line guide eye, the median portion formed with a second coil, both coils being situated proximal to and yieldingly movable toward said yoke when acted upon by a predetermined pull on the coacting fishing line.

9. The circuit make and break means defined in and according to claim 8, and in combination, a setscrew adjustably screwed into and carried by said second coil and providing a limit stop and being lined up with and adjustably engageable with said shank.

10. The structure defined in and according to claim 8, and in combination, a first elastic strap having end portions straddling and operatively connected to a rearward end portion of the battery case and a median portion to which a stake anchoring line is tied and connected, a second elastic strap like and complemental to said first elastic strap and likewise having end portions straddling and operatively connected to the forward end portion of said battery case, a main fishing line having a rearward end portion threaded through the aforementioned hole and operatively connected to said second coil, and an auxiliary bypass line, said bypass line spanning the battery case and having a rearward end connected to said stake anchoring line and a forward end connected to the rearward end portion of said fishing line and also connected to a median portion of said second elastic strap.

11. For use on the bulb-equipped end of a metal flashlight case, circuit make and break means comprising a relatively stationary contact comprising an adapter ring having an outer peripheral surface provided with a screw-threaded socket member and a shank having a screw-threaded end removably and adjustably screwed into the socket of said member and projecting axially therefrom, and a complemental relatively movable contact comprising an L-shaped member having long and short arms, said short arm being affixed to and anchored on said case and said long arm being flexible and resilient, proximal to and spaced from said shank, being pull-responsive when a fishing line is connected to the upper free end, and a current-conducting setscrew mounted adjustably on a median portion of said long arm and being operatively movable toward and from said shank.

12. An illuminable bite signal comprising, in combination, a relatively stationary ground-anchored vertically disposed stake, bite signalling means comprising a portable-type flashlight embodying a case containing a dry cell battery, said case having a forward end provided with a lamp bulb having protective-case-attached cap means, said bulb having operating connection with said battery, normally open pull-responsive circuit make and break means cooperable with said case and battery, a fishing line, trotline for example, having an end portion connected with and for closing said circuit and actuating said bulb when a predetermined pull is exerted on said fishing line, a typing and anchoring line tied at one end on said stake, suspension means cooperable with a rearward end portion of said case and a coacting end of said typing and anchoring line, additional suspension means connected to and cooperable with a forward portion of said case and connected with an adjacent coacting portion of said fishing line, said flashlight being thus hung between said first-named suspension means and said additional suspension means, and a normally slack check line spanning said flashlight and having a forward end connected to said fishing line and a rearward end connected to said tying and anchoring line, said check line being free of positive connection with any part of said flashlight.